US010378479B2

(12) United States Patent
Franer et al.

(10) Patent No.: US 10,378,479 B2
(45) Date of Patent: Aug. 13, 2019

(54) VARIABLE EFFECTIVE AREA FAN NOZZLE

(71) Applicant: General Electric Company, Schenectady, NY (US)

(72) Inventors: Matthew Timothy Franer, Cincinnati, OH (US); Brandon Wayne Miller, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 898 days.

(21) Appl. No.: 14/886,466

(22) Filed: Oct. 19, 2015

(65) Prior Publication Data
US 2017/0107943 A1 Apr. 20, 2017

(51) Int. Cl.
*F02K 1/00* (2006.01)
*F02K 1/72* (2006.01)
*F01D 25/24* (2006.01)
*F02C 3/04* (2006.01)
*F02K 1/76* (2006.01)
*F04D 19/00* (2006.01)
*F04D 29/52* (2006.01)
*F02K 1/09* (2006.01)

(52) U.S. Cl.
CPC .............. *F02K 1/72* (2013.01); *F01D 25/24* (2013.01); *F02C 3/04* (2013.01); *F02K 1/09* (2013.01); *F02K 1/763* (2013.01); *F04D 19/002* (2013.01); *F04D 29/522* (2013.01); *F05D 2220/32* (2013.01); *F05D 2220/36* (2013.01); *Y02T 50/672* (2013.01)

(58) Field of Classification Search
CPC ...... F02K 1/64; F02K 1/72; F02K 1/70; F02K 1/766
See application file for complete search history.

(56) References Cited

U.S. PATENT DOCUMENTS

| 5,259,187 | A | 11/1993 | Dunbar et al. |
| 5,778,659 | A | 7/1998 | Duesler et al. |
| 6,311,928 | B1 * | 11/2001 | Presz, Jr. ............... B64D 33/04 |
| | | | 239/265.29 |
| 8,006,479 | B2 | 8/2011 | Stern |
| 8,104,262 | B2 | 1/2012 | Marshall |
| 8,505,307 | B2 | 8/2013 | Wang |
| 8,978,356 | B2 | 3/2015 | Burgess |
| 9,016,040 | B2 | 4/2015 | Stuart et al. |

(Continued)

OTHER PUBLICATIONS

Extended European Search Report and Opinion issued in connection with corresponding EP Application No. 16193880.8 dated Mar. 8, 2017.

*Primary Examiner* — Gerald L Sung
(74) *Attorney, Agent, or Firm* — Dority & Manning, P.A.

(57) ABSTRACT

A turbofan engine is provided having a fan and a core in flow communication with the fan. The turbofan engine also includes a nacelle assembly enclosing the fan and at least a portion of the core to define a bypass passage with the core. The nacelle assembly includes a fan cowl extending around the fan and a thrust reverser system. The thrust reverser system is movable between a fully stowed position, a partially deployed position, and a fully deployed position. The thrust reverser system is configured to be held in the partially deployed position to allow an additional amount of airflow to exit from the bypass passage.

11 Claims, 6 Drawing Sheets

(56) References Cited

U.S. PATENT DOCUMENTS

| | | |
|---|---|---|
| 9,021,813 B2 | 5/2015 | Jasklowski et al. |
| 9,777,671 B2 * | 10/2017 | Ramlaoui ................. F02K 1/09 |
| 2003/0042358 A1 * | 3/2003 | Sternberger ............. F02K 1/72 |
| | | 244/110 B |
| 2009/0094961 A1 * | 4/2009 | Stern ........................ F02K 1/09 |
| | | 60/226.3 |
| 2009/0193789 A1 | 8/2009 | Pero |
| 2009/0288386 A1 | 11/2009 | Marshall et al. |
| 2012/0079804 A1 | 4/2012 | Stuart et al. |
| 2012/0291415 A1 | 11/2012 | Marshall |
| 2013/0145745 A1 * | 6/2013 | Kohlenberg ........... B64D 33/04 |
| | | 60/226.3 |
| 2013/0149099 A1 * | 6/2013 | Kohlenberg ........... B64D 33/04 |
| | | 415/1 |
| 2013/0149112 A1 * | 6/2013 | Kohlenberg ........... B64D 33/04 |
| | | 415/122.1 |
| 2014/0116024 A1 | 5/2014 | Channel |
| 2015/0275766 A1 | 10/2015 | Kohlenberg |
| 2016/0341150 A1 * | 11/2016 | Chuck ....................... F02K 1/72 |
| 2017/0159606 A1 | 6/2017 | Stuart |

\* cited by examiner

VARIABLE EFFECTIVE AREA FAN NOZZLE

FIELD OF THE INVENTION

The present subject matter relates generally to a gas turbine engine having a variable effective area fan nozzle.

BACKGROUND OF THE INVENTION

Turbofan engines generally include a fan and a core arranged in flow communication with one another. A first portion of air over the fan may flow past the core through a bypass airflow (defined between the core and an outer nacelle) and a second portion of air over the fan may be provided to the core.

The core of the turbofan engine generally includes, in serial flow order, a compression section, a combustion section, a turbine section, and an exhaust section. In operation, the air provided to the core flows through the compression section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The fan of the turbofan engine defines a fan pressure ratio. Certain turbofan engines are designed with a fan defining a relatively low fan pressure ratio, such as a fan pressure ratio less than about 1.4. However, such fans may experience an aeromechanical flutter when operated at such low fan pressure ratios. In order to alleviate such flutter, turbofan engines typically include a variable area fan nozzle to unload the fan, or more particularly, a plurality of fan blades of the fan. Typically, the variable area fan nozzles include a nacelle having an aft end capable of expanding in diameter. However, such variable area fan nozzles may be relatively complicated and heavy, potentially reducing an overall efficiency of the turbofan engine and increasing its expense.

Accordingly, other exemplary turbofan engines include a variable pitch fan to alleviate the aeromechanical flutter. Again, however, variable pitch fans can also be relatively complicated. Accordingly, a turbofan engine having a fan defining a relatively low fan pressure ratio and including one or more components capable of alleviating aeromechanical flutter would be particularly beneficial. More particularly, a turbofan engine having a fan defining a relatively low fan pressure ratio and including one or more components capable of alleviating aeromechanical flutter without requiring relatively heavy additional systems would be particularly useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method is provided for operating a gas turbine engine including a fan, a core in flow communication with the fan, and a nacelle assembly enclosing the fan and at least a portion of the core to define a bypass passage with the core. The nacelle assembly includes a thrust reverser system moveable between a fully stowed position and a fully deployed position. The method includes operating the fan at a fan pressure ratio of less than about two (2), and moving the thrust reverser system from the fully stowed position to a partially deployed position. The partially deployed position is located between the fully stowed position and the fully deployed position. The method also includes holding the thrust reverser system in the partially deployed position to allow an additional amount of airflow to exit the bypass passage.

In an exemplary embodiment of the present disclosure a turbofan engine is provided. The turbofan engine includes a fan defining a fan pressure ratio during operation, and a core in flow communication with the fan. The turbofan engine also includes a nacelle assembly enclosing the fan and at least a portion of the core to define a bypass passage with the core. The nacelle assembly includes a fan cowl extending around the fan, and a thrust reverser system moveable between a fully stowed position, a partially deployed position, and a fully deployed position. The thrust reverser system is configured to be held in the partially deployed position to allow an additional amount of airflow to exit from the bypass passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
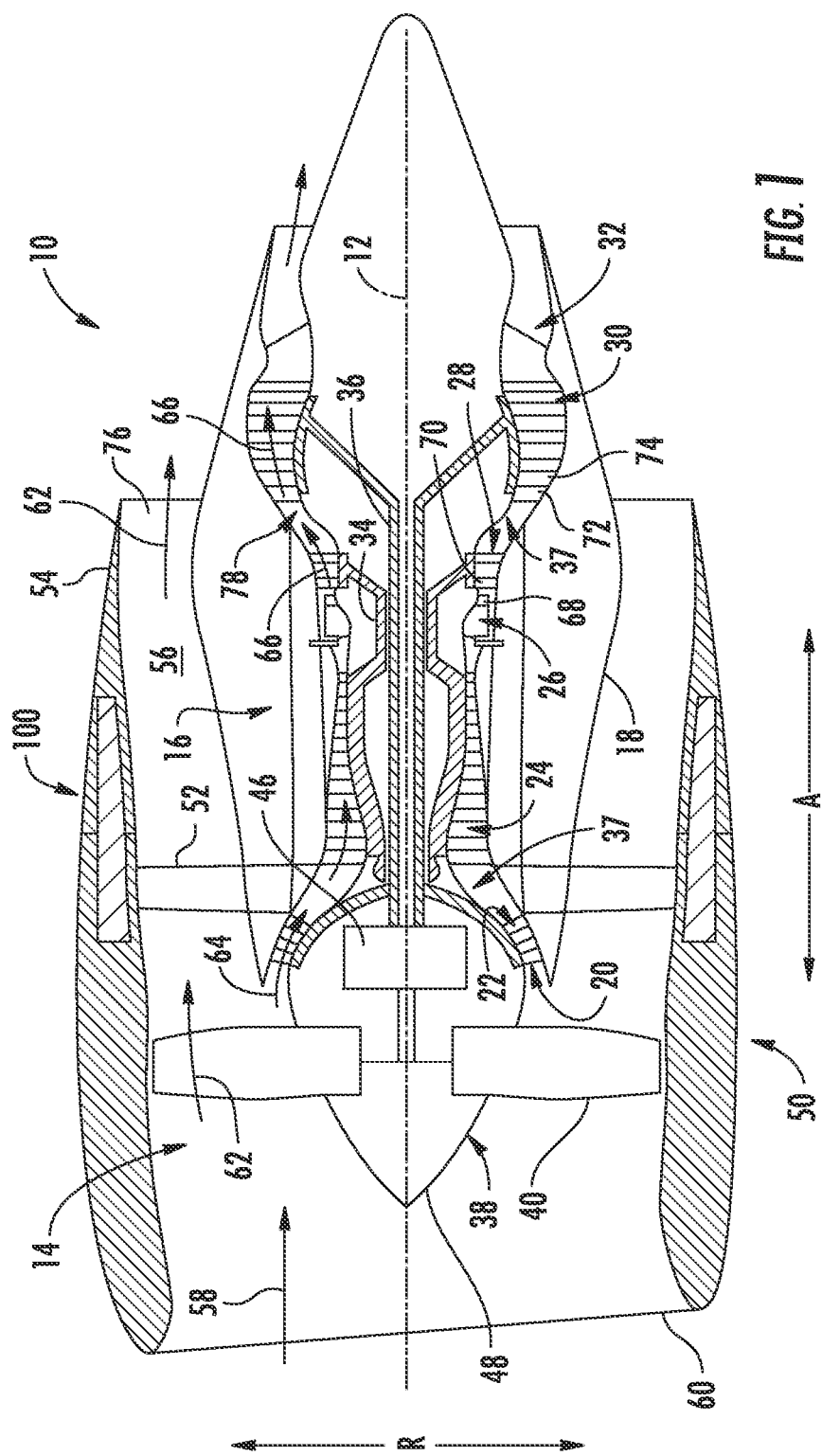
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 may also define a circumferential direction (not shown) extending circumferentially about the axial direction A. In general, the turbofan 10 includes a fan section 14 and a core turbine engine 16 disposed downstream from the fan section 14.

The exemplary core turbine engine 16 depicted is generally enclosed within a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the core turbine engine 16. It should be appreciated that the nacelle assembly 50 may be configured to be supported relative to the core turbine engine 16 by a plurality of circumferentially-spaced outlet guide vanes 52. Moreover, a downstream section 54 of the nacelle assembly 50 may extend over an outer portion of the casing 18 so as to define a bypass airflow passage 56 therebetween. As will be discussed in greater detail with reference to the exemplary embodiments below, the nacelle assembly 50 includes a thrust reverser system 100, which is depicted in a fully stowed position.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24. The second portion of air 64 then flows into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools.

Figure 2:
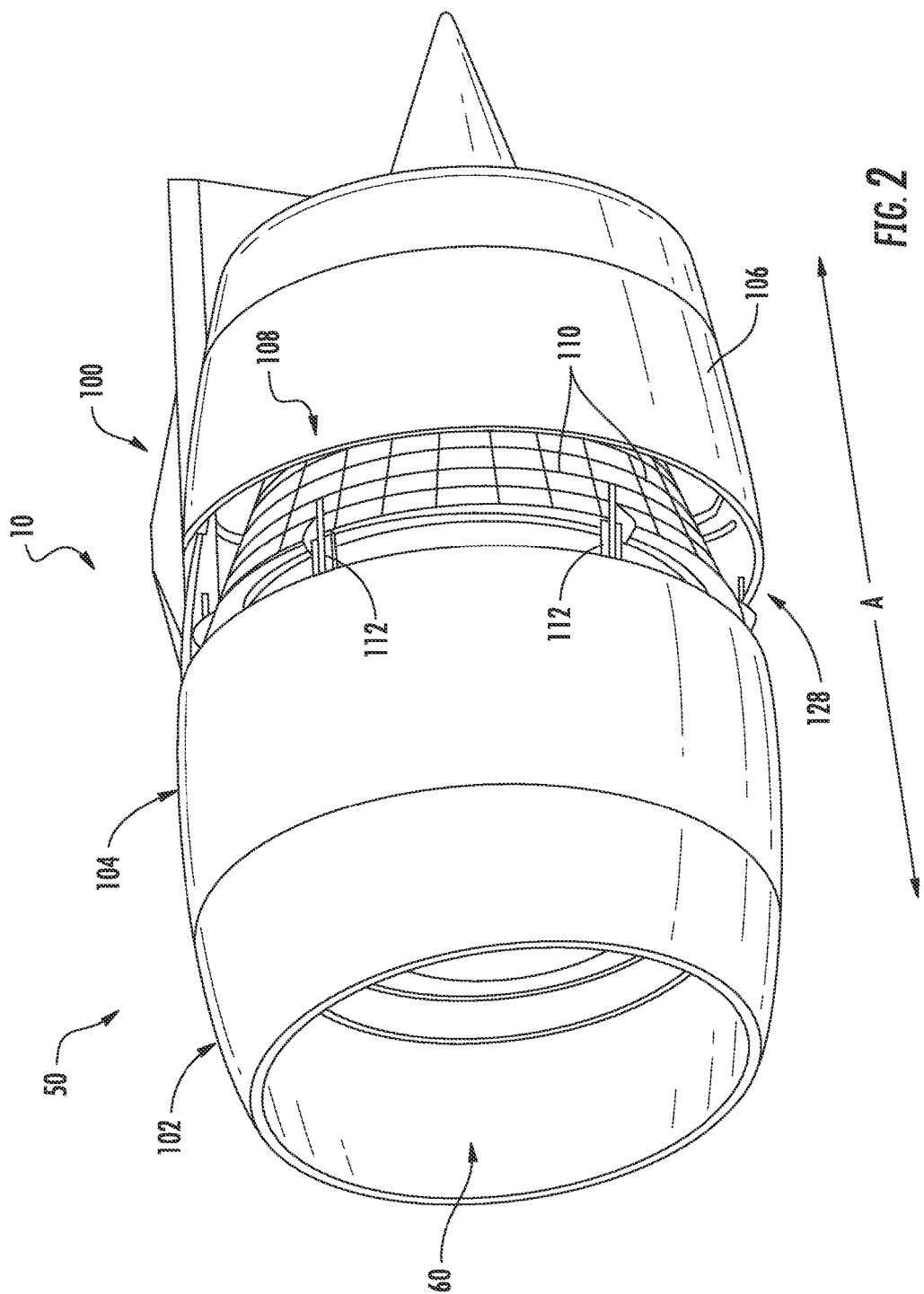
FIG. 2 is a perspective view of an exemplary turbofan engine according to another exemplary embodiment of the present disclosure having a thrust reverser system in a fully deployed position.
Figure 3:
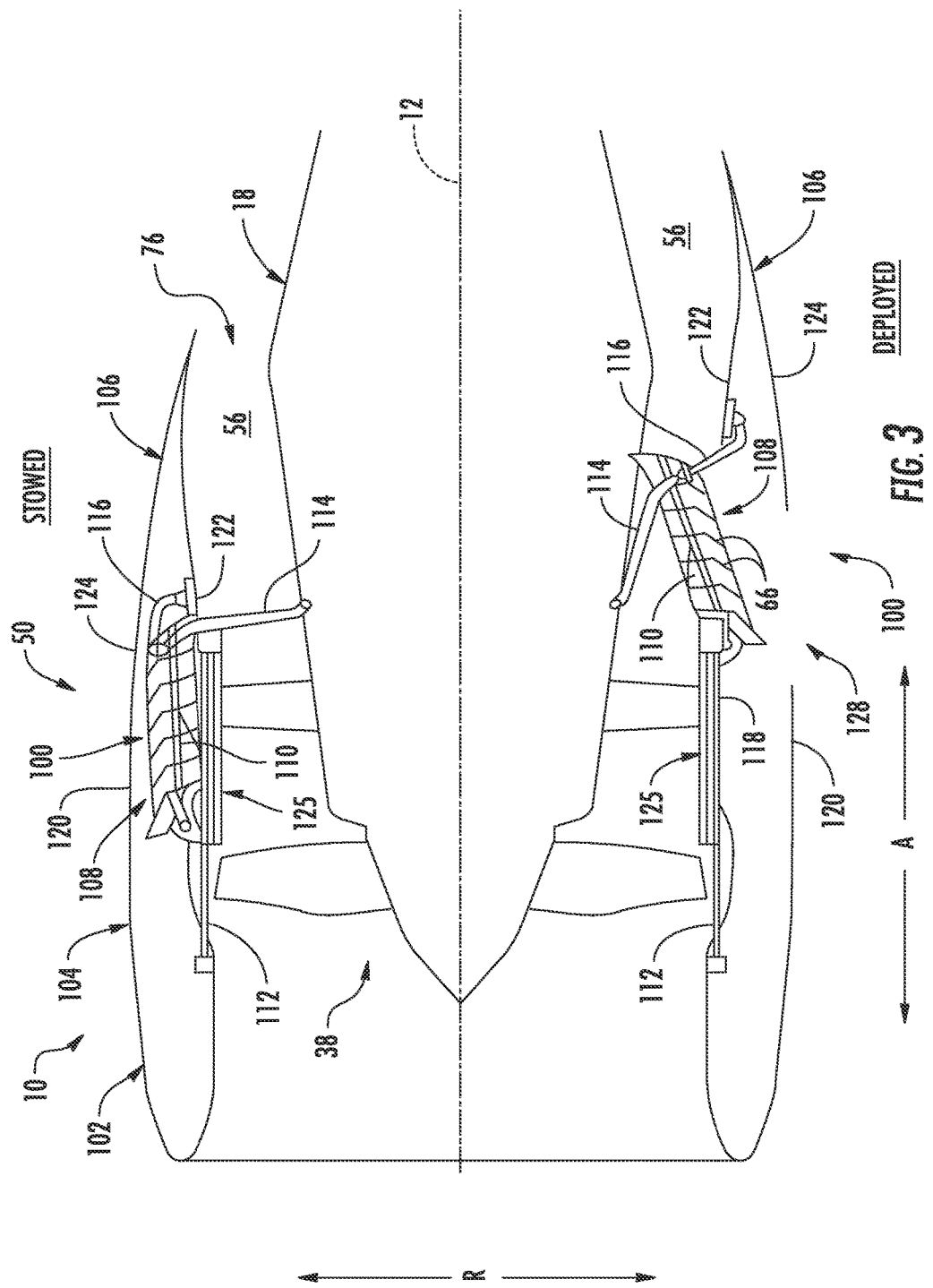
FIG. 3 is an axial, side, sectional view of the exemplary turbofan engine of FIG. 2 depicting the thrust reverser system in a fully stowed position and in a fully deployed position in the upper and lower halves of the view, respectively.
Figure 4:
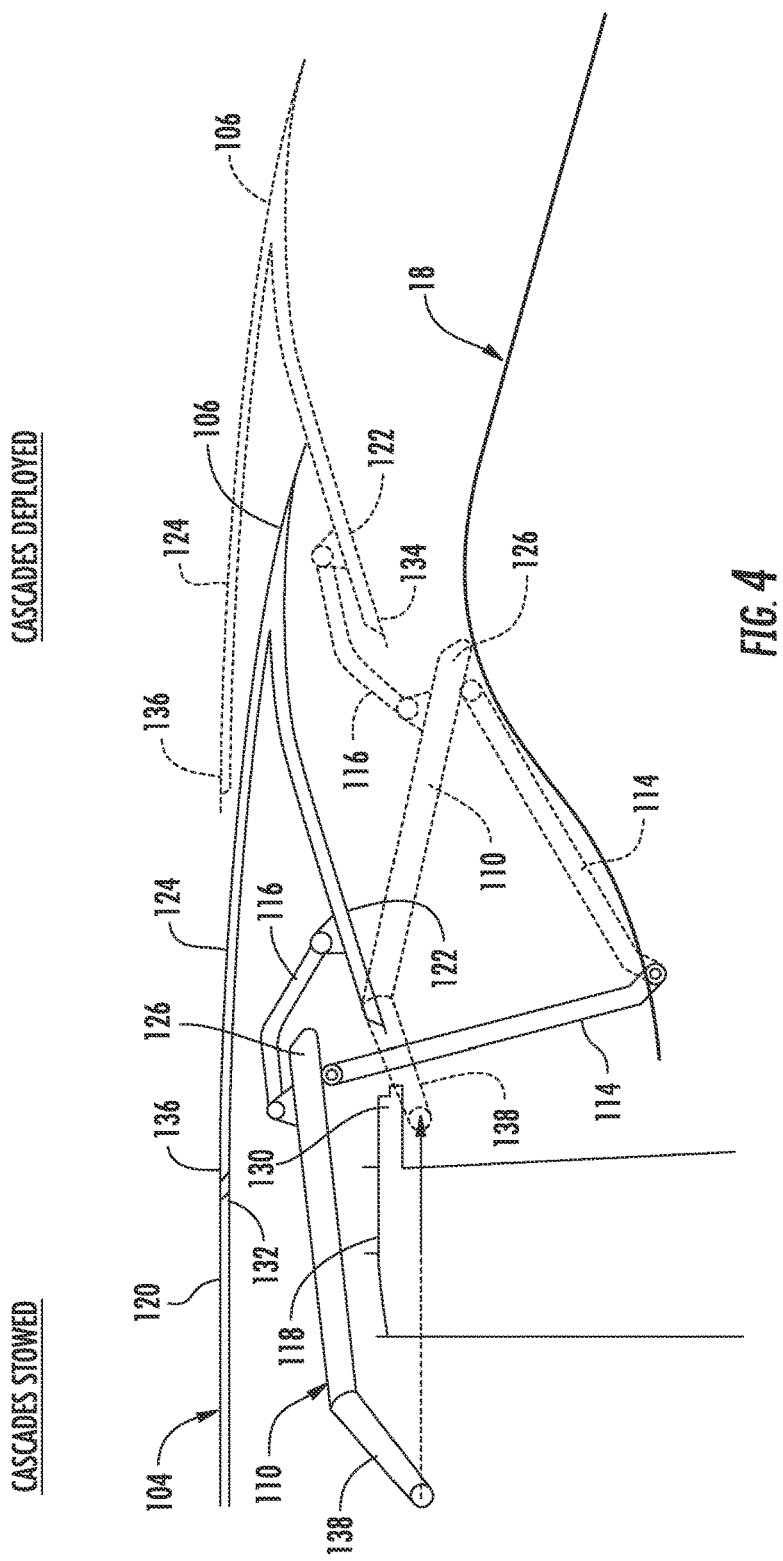
FIG. 4 is a close-up, sectional view of a section of the exemplary thrust reverser system in a fully stowed position and a fully deployed position (in phantom).

Referring now to FIGS. 2 through 4 a turbofan engine 10 in accordance with another exemplary embodiment of the present disclosure is provided. The exemplary turbofan engine 10 depicted in FIGS. 2 through 4 includes a thrust reverser system 100 in accordance with an exemplary embodiment of the present disclosure. Specifically, FIG. 2 provides a perspective view of the exemplary turbofan engine 10 with the thrust reverser system 100 in a fully deployed position; FIG. 3 provides a cross-sectional schematic view of the exemplary turbofan engine 10 along an axial direction A, a top half of which depicting the thrust reverser system 100 in a fully stowed position and a bottom half of which depicting the thrust reverser system 100 in a fully deployed position; and FIG. 4 provides a close up, schematic view of the exemplary thrust reverser system 100. The exemplary turbofan engine 10 of FIGS. 2 through 4 may be configured in substantially the same manner as the exemplary turbofan engine 10 of FIG. 1. Accordingly, the same numbering may refer to the same or functionally equivalent components.

As depicted, a nacelle assembly 50 of the turbofan engine 10 generally includes an inlet assembly 102, a fan cowl 104, and the thrust reverser system 100. The inlet assembly 102 is positioned at a forward end of the nacelle assembly 50 and the fan cowl 104 is positioned aft of the inlet assembly 102 and at least partially surrounds the fan 38. The thrust reverser system 100 is, in turn, positioned at least partially aft the fan cowl 104. As is depicted, an outer casing 18 of a core 16 defines a radially inward boundary of a bypass passage 56 and the nacelle assembly 50 defines a radially outward boundary of the bypass passage 56. Bypass air of the engine 10 passes through the bypass passage 56 and exits through a fan exit nozzle 76 during certain operations.

The thrust reverser system 100 of FIGS. 2 through 4 includes a translating cowl (transcowl) 106 slidably mounted to the fan cowl 104, and a cascade system 108. As evident from FIG. 2, the transcowl 106 is the aft-most section of the nacelle assembly 50, located aft of the fan cowl 104 and circumscribing the outer casing 18 of the core 16. When in a fully deployed position (see FIG. 2 and bottom portion of FIG. 3), the cascade system 108 is also located aft of the fan cowl 104 and circumscribes the outer casing 18 of the core 16. By contrast, when in a fully stowed position (see top portion of FIG. 3) the cascade system 108 is stowed at least partially within the fan cowl 104. Furthermore, as the cascade system 108 is stowed at least partially within the fan cowl 104 when in the fully stowed position (and slides/translates into the deployed position), inclusion of the cascade system 108 may not add to an overall axial length of the nacelle assembly 50.

The cascade system 108 is depicted formed of/including a plurality of individual cascade segments 110 that are circumferentially spaced around a circumference of the nacelle assembly 50. As evident from FIGS. 3 and 4, the segments 110 of the cascade system 108 are adapted to deploy from a fully stowed position, shown in the upper half of FIG. 3 and shown in the detailed view of FIG. 4, to a fully deployed position shown in the lower half of each of FIG. 3 and shown in phantom in FIG. 4. For the embodiment depicted, the transcowl 106 and cascade system 108 are adapted to be translated in unison in an aft direction of the engine 10 when the thrust reverser system 100 is moved from the fully stowed position to the fully deployed position (i.e., deployed). More particularly, to deploy the cascade system 108 into the bypass passage 56, the transcowl 106 is moved aftwardly from the fan cowl 104 generally along the axial direction A and the cascade system 108 is pivoted into the bypass passage 56, causing a flow of bypass air within the passage 56 to be diverted through the deployed cascade system 108 to provide a thrust reversal effect. For this purpose, FIGS. 2 through 4 represent the cascade segments 110 as pivotally coupled to the nacelle assembly 50 through respective actuators 112 mounted to the nacelle assembly 50. The actuators 112 are configured to move the thrust reverser system 100 from the fully stowed position to the fully deployed position. The actuators 112 can be of any suitable type and can be driven by, e.g., pneumatic, hydraulic, or electric motors. Additionally, the cascade systems 110 are depicted being coupled to a fixed structure of the nacelle assembly 50 with guided connections 125. Further, FIGS. 3 and 4 represent the cascade segments 110 as pivotally coupled to the outer casing 18 of the core 16 with drag links 114, and represent the transcowl 106 as pivotally coupled to the cascade segments 110 through links 116 for translation therewith.

Translation of the cascade system 108 and transcowl 106 in the aft direction along the axial direction A causes the cascade segments 110 to be deployed into the bypass passage 56 in a manner represented in FIGS. 3 and 4. From these figures it can be appreciated that, when fully stowed, the cascade segments 110 are enclosed and completely concealed between inner and outer engine fan cases 118, 120 of the fan cowl 104 and the inner and outer walls 122, 124 of the transcowl 106. Accordingly, when the thrust reverser system 100 is fully stowed, the inner engine fan case 118 and the inner wall 122 of the transcowl 106 define a portion of the radially outer flow surface of the bypass passage 56 and completely separate the cascade system 108 from the duct 56. An advantage of this configuration is that the thrust reverser system 100 of this invention does not have blocker doors that define any portion of the radially outer flow surface of the bypass passage 56 during normal engine operation. Consequently, the thrust reverser system 100 can be configured to avoid surface interruptions (gaps and steps) and duct leakage that would increase aerodynamic drag and reduce aerodynamic performance of the engine 10 when the thrust reverser system 100 is in the fully stowed position. Another advantage is that the entire inner wall 122 of the transcowl 106 can incorporate an uninterrupted acoustic treatment (not shown) of its entire surface area to promote increased engine noise attenuation.

By contrast, when moved to the fully deployed position, the cascade segments 110 of the thrust reverser system 100 may, but are not required to, extend entirely across a radial width of the duct 56 so that its aft end 126 contacts, or nearly contacts, the outer casing 18 of the core 16. As represented in FIG. 3, as bypassed air within the duct 56 encounters the cascade system 108, the air is diverted by grid openings in the segments 110 and expelled through a circumferential opening 128 defined between the aft ends 130, 132 of the inner and outer engine fan cases 118, 120 and the forward ends 134, 136 of the inner and outer walls 122, 124 of the transcowl 106 (FIG. 4). As depicted in FIG. 3, each segment 110 can be equipped with an extension that promotes the capture of air flowing along the outer surface of the outer casing 18 of the core 16.

As evident from the above, the embodiment depicted incorporates to some extent a conventional role of a blocker door function into the cascade system 108, and does so by adding rotation to the traditional translating motion of cascades. To serve in this role, each cascade segment 110 must have a sufficient length and be sufficiently angled downward to, in certain embodiments, completely block the fan bypass passage 56. For this reason, it is likely that the segments 110 may be longer than fixed cascades that may otherwise be employed in the turbofan engine 10.

It should be appreciated, however, that the exemplary thrust reverser system 100 depicted is provided by way of example only, and that in other exemplary embodiments, the thrust reverser system 100 may have any other suitable configuration. For example, while the embodiment of FIGS. 2 through 4 depict each cascade segment 110 as equipped with two different links 114 and 116 rotatably coupled near the aft end 126 of each segment 110 to impart and control the rotational movement of the segment 110 during deployment, in other exemplary embodiments the link 114 may be eliminated in order to further decrease aerodynamic drag and other flow perturbations that can cause aerodynamic or acoustic inefficiencies. Additionally, it should be appreciated that the translational-rotational motion of the cascade segments 110 are not dependent on any particular type of cascade design, aside from the requirement that the cascade system 108 is capable of turning the air flow within the bypass passage 56. For example, in still other embodiments, the thrust reverser system 100 may not include either of the links 114, 116 shown, and instead may, e.g., rely on a geometry of the cascade system 108 and a kinematic deployment system. Furthermore, whereas the cascade segments 110 represented in FIGS. 2 through 4 have rigid constructions that do not intentionally bend, flex or fold during deployment, cascade segments 110 having any of these capabilities are also within the scope of the present disclosure. Finally, it should also be appreciated that the thrust reverser system 100 and its individual components can be constructed of various materials, including metallic, plastic and composite materials commonly used in aerospace applications and fabricated by machining, casting, molding, lamination, etc., and combinations thereof.

Figure 5:
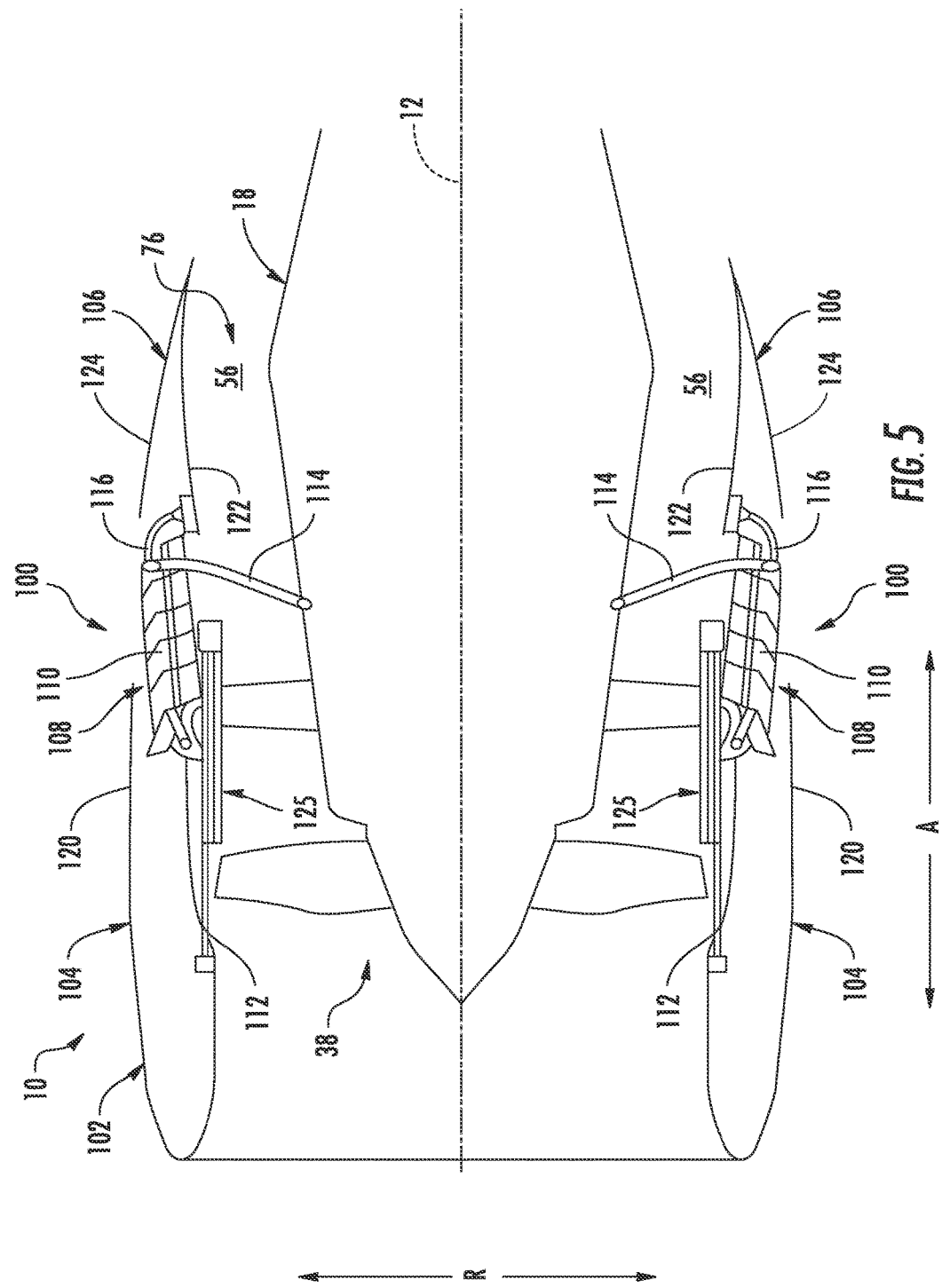
FIG. 5 is an axial, side, sectional view of the exemplary turbofan engine of FIG. 2 depicting the thrust reverser system in a partially deployed position.

Referring particularly to FIG. 3, and now also to FIG. 5, movement of the thrust reverser system 100 between the fully stowed position and the fully deployed position includes at least two distinct phases during deployment of the thrust reverser system 100. During an initial/"aft movement" phase, each cascade segment 110 translates aftward with the transcowl 106 relative to the fan cowl 104, generally along the axial direction A, with minimal rotational movement between the segments 110 and fan cowl 104. During a subsequent/"rotational movement" phase, with further aftward movement of the forward end 138 of the cascade segment 110 coupled to its actuator 112, each cascade segment 110 pivots about its forward end 138 as a result of the drag link 114 restricting aftward movement of the aft end 126 of the segment 110, causing the aft end 126 to move radially inward toward the outer casing 18 of the core 16 until each segment 110 assumes its fully deployed position and extends across the radial width of the duct 56.

Notably, however, the exemplary turbofan engine 10 depicted in FIG. 5 is configured to hold the thrust reverser system 100 in a partially deployed position (see FIG. 5) during certain operations. More particularly, the thrust reverser system 100, as discussed, is deployed from the fully stowed position to the fully deployed position through two distinct phases. For the embodiment depicted, turbofan engine 10 is configured to stop a movement of the thrust reverser system 100 during, or at the end of, the initial aft movement phase in what is referred to herein as the "partially deployed position," and hold the thrust reverser system 100 in such partially deployed position. When the exemplary thrust reverser system 100 is positioned in the partially deployed position, the thrust reverser system 100 allows an additional amount of airflow to exit radially from the bypass passage 56, while the turbofan engine 10, and more particularly the fan 38, continue to generate a net forward thrust.

Further to the above discussion, in order to move the thrust reverser system 100 from the fully stowed position to the partially deployed position, the transcowl 106 of the thrust reverser system 100 is moved aftwardly away from the fan cowl 104 generally along the axial direction A, such that the nacelle assembly 50 defines the opening 128 between the fan cowl 104 and the transcowl 106. The opening 128 may generally be an annular opening. Additionally, in at least certain exemplary embodiments, the opening 128 defined between the fan cowl 104 and the transcowl 106 when the thrust reverser system 100 is in the partially deployed position may be at least about three inches long along the axial direction A. Alternatively, however, in other exemplary embodiments, the opening 128 may instead be at least about five inches long along the axial direction A, at least about seven inches long along the axial direction A, or at least about nine inches long along the axial direction A. For example, a length of the opening 128 defined between the fan cowl 104 and the transcowl 106 when the thrust reverser system 100 is in the partially deployed position may be at least about 2% of a diameter of the fan 38 (along the radial direction R), at least about 4% of a diameter of the fan 38, at least about 6% of a diameter of the fan 38, or any other suitable size. It should be appreciated, that as used herein, terms of approximation, such as "about" or "approximate," refer to being within a ten percent margin of error.

Notably, when the exemplary thrust reverser system 100 is in the partially deployed position, a majority of the components of the thrust reverser system 100 remain outside of the bypass passage 56. For example, when the exemplary thrust reverser system 100 is in the partially deployed position, the cascade segments 110 of the thrust reverser system 100 remain at a location substantially outside of the bypass passage 56, as the cascade segments 110 have not pivoted inwardly.

Moreover, as briefly discussed above, moving the thrust reverser system 100 to the partially deployed position may allow for an additional amount of airflow to exit the bypass passage 56. Accordingly, in effect, moving the thrust reverser system 100 to the partially deployed position allows the turbofan engine 10 to define a larger effective fan nozzle throat area (i.e., at nozzle section 76). More particularly, for the embodiment depicted, moving the thrust reverser system 100 to the partially deployed position, such that the nacelle assembly 50 defines the opening 128 between the transcowl 106 and the fan cowl 104, allows for at least about fifteen percent of an airflow through the bypass passage 56 (i.e., bypassed air) to exit through the opening 128 during operation. However, in other exemplary embodiments, moving the thrust reverser system 100 to the partially deployed position may further allow for at least about twenty percent, at least about twenty-five percent, or at least about thirty percent of an airflow through the bypass passage 56 to exit through the opening 128 during operation. In any of the above embodiments, moving the thrust reverser system 100 to the partially deployed position allows for an increased overall airflow through the bypass passage 56 as the opening 128 provides a path for the airflow through the bypass passage 56 to flow in addition to the fan nozzle throat area (i.e., the nozzle section 76).

A turbofan engine 10 including a nacelle assembly 50 configured in such a manner may be configured to hold the thrust reverser system 100 in the partially deployed position when the fan defines a relatively low fan pressure ratio (i.e., a pressure ratio across the fan 38). For example, the turbofan engine 10 may be configured to hold the thrust reverser system 100 in the partially deployed position when the fan 38 defines a fan pressure ratio of less than about two (2), or further less than about one and a half (1.5), less than about 1.35, or less than about 1.25. Such a configuration may minimize an amount of aeromechanical flutter instability during operation of the fan 38 at such relatively low fan pressure ratios. More particularly, by holding the thrust reverser system 100 in the partially deployed position, the increased effective fan nozzle area may unload a portion of an airflow from the fan blades 40 to alleviate an aeromechanical flutter instability of such fan blades 40.

In at least certain exemplary embodiments, operating the fan 38 at a relatively low fan pressure ratio may correspond to times in which a relatively low amount of thrust is required from the fan 38. For example, operating the fan 38 at a relatively low fan pressure ratio may correspond to a taxiing operating mode of the turbofan engine 10, i.e., a taxiing operating mode of an aircraft to which the turbofan engine 10 is mounted. Accordingly, in certain exemplary embodiments, the turbofan engine 10 may be configured to hold the thrust reverser system 100 in the partially deployed position when the turbofan engine 10 is operated in a taxiing operating mode.

Figure 6:
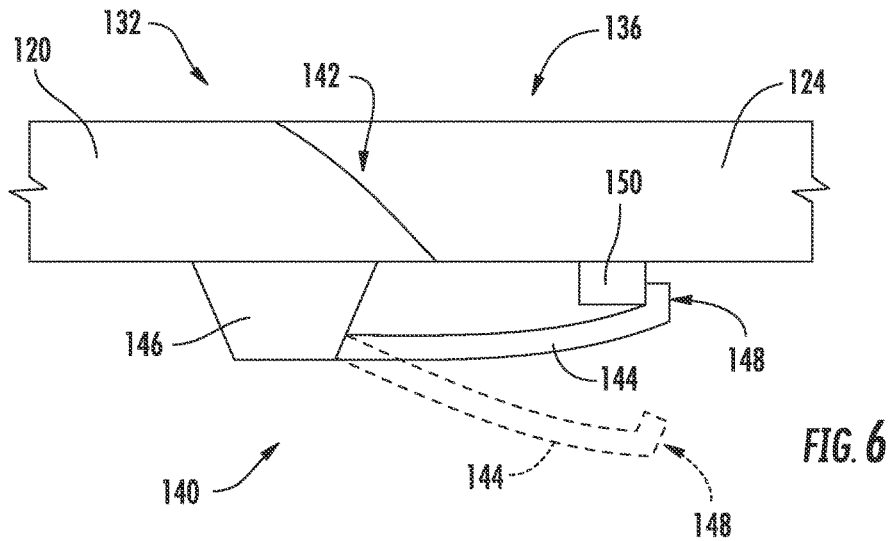
FIG. 6 provides a schematic view of a locking mechanism in accordance with an exemplary embodiment of the present disclosure.

Further, in order to ensure the thrust reverser system 100 is not unintentionally moved to the partially deployed position (or the fully deployed position) during other operating modes of the turbofan engine 10, the exemplary nacelle assembly 50 may further includes a locking mechanism 140 configured to block the thrust reverser system 100 from movement when the thrust reverser system 100 is in the fully stowed position. For example, referring now to FIG. 6, a close-up, schematic view is provided of a nacelle assembly 50 in accordance with an exemplary embodiment of the present disclosure including an exemplary locking mechanism 140. More particularly, FIG. 6 depicts a juncture 142 between an exemplary transcowl 106 and a fan cowl 104 when a thrust reverser system 100 is in a fully stowed position. The juncture 142 may include a sealing feature (e.g., an elastomeric seal or gasket between the fan cowl 104 and transcowl 106) to prevent any air leakage when the thrust reverser system 100 is in the stowed position. The locking mechanism 140 generally includes a lever 144 rotatably attached to an actuator 146 positioned on the fan cowl 104, the lever 144 having a hook 148 at a distal end. The hook 148 of the lever 144 engages with a stop block 150 on the transcowl 106 when the locking mechanism 140 is in the locked position (shown), to prevent movement of the transcowl 106 relative to the fan cowl 104. By contrast, when the locking mechanism 140 is in an unlocked position (shown in phantom), the hook 148 of the lever 144 is disengaged with the stop block 150 on the transcowl 106, such that the transcowl 106 may move generally along the axial direction A relative to the fan cowl 104. The locking mechanism 140 may be operated independently of the thrust reverser system 100. Accordingly, the locking mechanism 140 may be checked to ensure its operation by activating the locking mechanism 140 and independently attempting to move the thrust reverser system 100 from the fully stowed position.

It should be appreciated, however, that the exemplary locking mechanism 140 depicted is provided by way of example only, and that in other exemplary embodiments, any other suitable locking mechanism 140 may be provided. For example, in other exemplary embodiments, the locking mechanism 140 may include a retractable pin configured with a slot to releasably lock the transcowl 106 to the fan cowl 104. Further, in other embodiments, the locking mechanism 140 may be manually or automatically controlled independently of the thrust reverser system 100. For example, the locking mechanism may be automatically controlled in response to a sensor configured to determine when one or more wheels of an airplane to which the turbofan engine 10 is attached are on the ground (e.g., a weight sensor).

Figure 7:
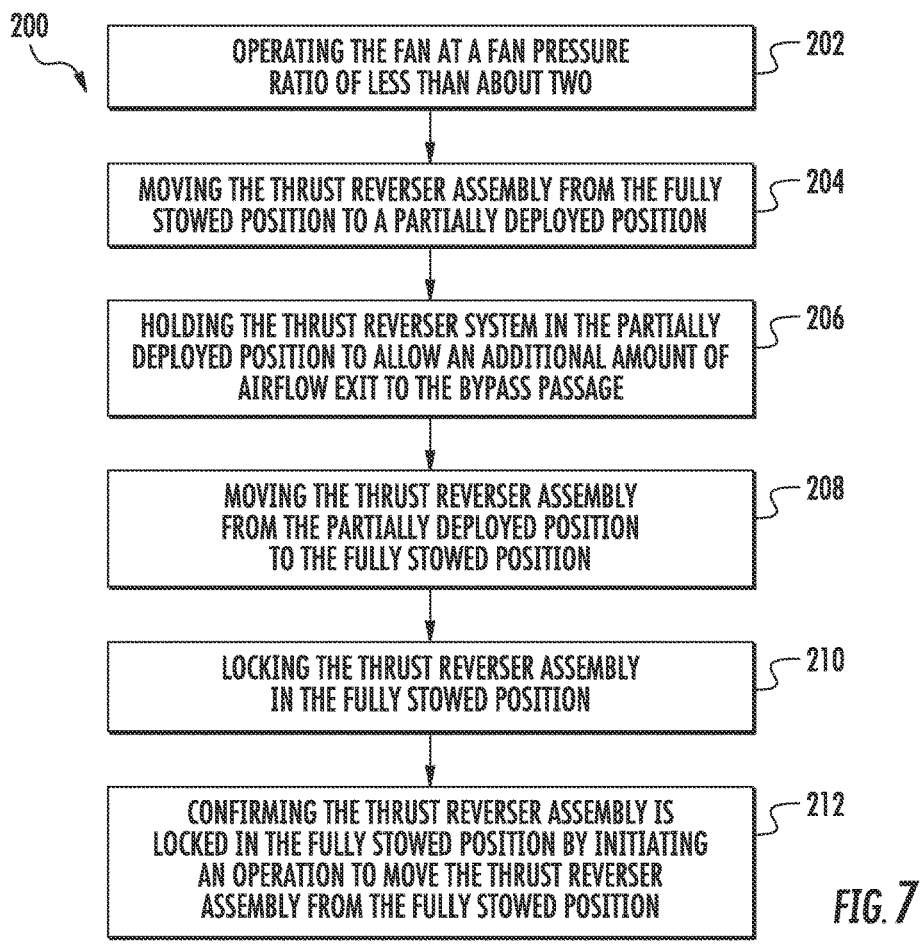
FIG. 7 provides a flow diagram of a method for operating a turbofan engine in accordance with an exemplary aspect of the present disclosure.

Referring now to FIG. 7, a flow diagram is provided of an exemplary method (200) for operating a gas turbine engine in accordance with an exemplary aspect of the present disclosure. For example, the exemplary method (200) may be configured for operating a gas turbine engine comprising a fan, a core in flow communication with the fan, and a nacelle assembly enclosing the fan and at least a portion of the core to define a bypass passage with the core. Additionally, the nacelle assembly of the gas turbine engine operated by the exemplary method (200) may include a thrust reverser system movable between a fully stowed position and a fully deployed position. Accordingly, the exemplary method (200) may be configured to operate the turbofan engine 10 discussed above with reference to FIGS. 2 through 5.

The exemplary method (200) includes at (202) operating the fan at a fan pressure ratio of less than about two. However, in other exemplary aspects, operating the fan and a fan pressure ratio of less than about two at (202) may further include operating the fan and a fan pressure ratio of less than about 1.5 or lower. Notably, operating the fan and a fan pressure ratio of less than about two at (202) may correspond to an operating condition in which a relatively low amount of thrust is desired from the fan. For example, in certain exemplary aspects, operating the fan at the fan pressure ratio of less than about two may include operating the fan during a taxiing operating mode of the gas turbine engine and/or of an aircraft to which the gas turbine engine is attached.

Referring still to FIG. 7, the exemplary method (200) additionally includes at (204) moving the thrust reverser assembly from the fully stowed position to a partially deployed position. The partially deployed position is located between the fully stowed position and the fully deployed position. Notably, moving the thrust reverser to the partially deployed position at (204) may include moving a transcowl of the thrust reverser assembly aftwardly from a fan cowl of the nacelle assembly to define an opening therebetween, and may also include maintaining a cascade segment of the thrust reverser system at a location substantially outside of the bypass passage of the gas turbine engine.

The exemplary method (200) may also include at (206) holding the thrust reverser system in the partially deployed position to allow an additional amount of airflow to exit the bypass passage. Notably, holding the thrust reverser in the partially deployed position may allow for at least about fifteen percent of an airflow through the bypass passage to exit through the opening defined between the transcowl and the fan cowl.

Furthermore, the exemplary method (200) depicted includes at (208) moving the thrust reverser assembly from the partially deployed position to the fully stowed position, and at (210) locking the thrust reverser assembly in the fully stowed position. For example, the exemplary method (200) may move the thrust reverser system to the fully stowed position at (208) and may lock the thrust reverser system in the fully stowed position at (210) after a taxiing operating mode and prior to a takeoff operating mode of the gas turbine engine, or an aircraft to which the gas turbine engine is attached. Locking the thrust reverser assembly in the fully stowed position at (210) may ensure the thrust reverser assembly is not inadvertently moved to a partially deployed position or fully deployed position during flight.

Referring still to FIG. 7, the exemplary method (200) additionally includes at (212) confirming the thrust reverser assembly is locked in the fully stowed position by initiating an operation to move the thrust reverser assembly from the fully stowed position. In certain exemplary aspects, a locking assembly for locking the thrust reverser system in the fully stowed position at (210) may be provided and operated independently of the thrust reverser system. Additionally, confirming the thrust reverser assembly is locked in the fully stowed position at (212) may also take place prior to a flight operating mode of, e.g., the gas turbine engine or an aircraft to which the gas turbine engine is attached.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a gas turbine engine comprising a fan, a core in flow communication with the fan, and a nacelle assembly enclosing the fan and at least a portion of the core to define a bypass passage with the core, the nacelle assembly including a thrust reverser system moveable between a fully stowed position and a fully deployed position, the method comprising:
   operating the fan at a fan pressure ratio of less than about two (2);
   moving the thrust reverser system from the fully stowed position to a partially deployed position, the partially deployed position located between the fully stowed position and the fully deployed position; and
   holding the thrust reverser system in the partially deployed position to allow an additional amount of airflow to exit the bypass passage.

2. The method of claim 1, wherein the nacelle assembly includes a fan cowl enclosing the fan, wherein the thrust reverser system includes a transcowl positioned aft of the fan cowl, and wherein moving the thrust reverser to the partially deployed position includes moving the transcowl aftwardly from the fan cowl to define an opening therebetween.

3. The method of claim 2, wherein moving the thrust reverser system from the fully stowed position to the partially deployed position includes moving the transcowl aftwardly at least about five inches.

4. The method of claim 2, wherein the fan defines a fan diameter, and wherein moving the thrust reverser system from the fully stowed position to the partially deployed position includes moving the transcowl aftwardly a distance equal to at least about 2% of the fan diameter.

5. The method of claim 2, wherein holding the thrust reverser in the partially deployed position includes allowing at least about fifteen percent (15%) of an airflow through the bypass passage to exit through the opening defined between the transcowl and the fan cowl.

6. The method of claim 1, wherein moving the thrust reverser to the partially deployed position includes maintaining a cascade segment of the thrust reverser at a location substantially outside of the bypass passage.

7. The method of claim 1, wherein the gas turbine engine is a turbofan engine, and wherein the fan is a fixed-pitch fan.

8. The method of claim 1, wherein operating the fan at the fan pressure ratio of less than about two (2) includes operating the fan at a fan pressure ratio of less than about 1.5.

9. The method of claim 1, wherein operating the fan at the fan pressure ratio of less than about two (2) includes operating the fan during a taxiing operating mode.

10. The method of claim 1, further comprising
    moving the thrust reverser system from the partially deployed position to the fully stowed position; and
    locking the thrust reverser system in the fully stowed position.

11. The method of claim 10, further comprising
    confirming the thrust reverser system is locked in the fully stowed position by initiating an operation to move the thrust reverser system from the fully stowed position.

* * * * *